(12) United States Patent
Yamada et al.

(10) Patent No.: US 9,457,691 B2
(45) Date of Patent: Oct. 4, 2016

(54) SEAT SLIDE APPARATUS FOR VEHICLE

(71) Applicant: AISIN SEIKI KABUSHIKI KAISHA, Kariya-shi (JP)

(72) Inventors: Yukifumi Yamada, Toyota (JP); Naoki Goto, Tokai (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 148 days.

(21) Appl. No.: 14/284,582

(22) Filed: May 22, 2014

(65) Prior Publication Data
US 2014/0354023 A1 Dec. 4, 2014

(30) Foreign Application Priority Data

May 30, 2013 (JP) .................................. 2013-114698

(51) Int. Cl.
*B60N 2/07* (2006.01)
*B60N 2/06* (2006.01)

(52) U.S. Cl.
CPC ............. *B60N 2/0732* (2013.01); *B60N 2/062* (2013.01); *B60N 2/072* (2013.01); *B60N 2/0705* (2013.01); *B60N 2/0715* (2013.01)

(58) Field of Classification Search
CPC B60N 2/0732; B60N 2/0717; B60N 2/0715; B60N 2/062; B60N 2/0705; B60N 2/072
USPC ........................................ 248/429; 297/344.1
See application file for complete search history.

(56) References Cited

U.S. PATENT DOCUMENTS

| 3,007,668 | A | * | 11/1961 | Dall | ..................... | B60N 2/0717 248/429 |
| 4,981,278 | A | * | 1/1991 | Rees | ..................... | B60N 2/0717 248/430 |
| 5,447,352 | A | * | 9/1995 | Ito | ........................ | B60N 2/0232 248/424 |
| 6,499,712 | B1 | * | 12/2002 | Clark | ................... | B60N 2/0232 248/424 |
| 8,844,891 | B2 | * | 9/2014 | Yamada | ............... | B60N 2/0715 248/429 |
| 2003/0230696 | A1 | | 12/2003 | Yamada et al. | | |
| 2009/0102261 | A1 | * | 4/2009 | Bernhardt | ............ | B60N 2/0715 297/344.1 |
| 2010/0187397 | A1 | | 7/2010 | Yamada et al. | | |
| 2010/0327138 | A1 | | 12/2010 | Yamada et al. | | |

FOREIGN PATENT DOCUMENTS

| JP | DE 4304107 A1 * | 9/1993 | ............. B60N 2/067 |
| JP | 2003-252087 | 9/2003 | |
| JP | 2004-90765 | 3/2004 | |

* cited by examiner

*Primary Examiner* — Milton Nelson, Jr.
(74) *Attorney, Agent, or Firm* — Oblon, McClelland, Maier & Neustadt, L.L.P.

(57) ABSTRACT

A seat slide apparatus for a vehicle includes an upper rail configured to support a seat at an upper portion of the upper rail, a lower rail supporting the upper rail in a manner that the upper rail and the lower rail are movable relative to each other, and a shaft member extended in a lengthwise direction of the upper rail, wherein the upper rail includes a pair of vertical wall portions extended in an upper/lower direction, the upper rail includes a bent portion connecting the vertical wall portions to each other and the shaft member is provided at an inner side of the bent portion, and the shaft member includes a threaded portion provided at each end thereof in an axial direction, the bent portion includes lengthwise-direction-end portions, and the threaded portions of the shaft member face the lengthwise-direction-end portions of the bent portion.

11 Claims, 9 Drawing Sheets

SEAT SLIDE APPARATUS FOR VEHICLE

CROSS REFERENCE TO RELATED APPLICATIONS

This application is based on and claims priority under 35 U.S.C. §119 to Japanese Patent Application 2013-114698, filed on May 30, 2013, the entire content of which is incorporated herein by reference.

TECHNICAL FIELD

This disclosure generally relates to a seat slide apparatus for a vehicle.

BACKGROUND DISCUSSION

Usually, a seat slide apparatus for a vehicle includes an upper rail supporting a seat at an upper portion thereof and a lower rail supporting the upper rail in a state where the upper rail and the lower rail are movable relative to each other. In many cases, the upper rail is made from plate material which is bent or folded.

For example, according to a seat slide apparatus described in JP2004-90765A (which will be hereinafter referred to as Patent reference 1), an upper rail includes a pair of vertical wall portions facing each other and a bent portion connecting upper portions of the vertical wall portions to each other. A threaded portion used for fastening a seat is provided at each lengthwise-direction-end portion of the upper rail.

Further, JP2003-252087A (which will be hereinafter referred to as Patent reference 2) discloses a configuration where a reinforcement member formed in a plate shape is provided between vertical wall portions which constitute an upper rail. Thus, a support rigidity of the upper rail may be enhanced.

However, for example, at a vehicle collision, an extremely large load which is caused by an external force acting on the seat is applied to the upper rail. In order to avoid a deformation of the upper rail which is caused by such external force, the support rigidity of the upper rail is desired to be even more enhanced. Therefore, room for improvement remains in this regard.

A need thus exists for a seat slide apparatus for a vehicle, which is not susceptible to the drawback mentioned above.

SUMMARY

According to an aspect of this disclosure, a seat slide apparatus for a vehicle includes an upper rail configured to support a seat at an upper portion of the upper rail, a lower rail supporting the upper rail in a manner that the upper rail and the lower rail are movable relative to each other, and a shaft member extended in a lengthwise direction of the upper rail, wherein the upper rail includes a pair of vertical wall portions extended in an upper/lower direction, the upper rail includes a bent portion connecting the vertical wall portions to each other at upper portions of the vertical wall portions and the shaft member is provided at an inner side of the bent portion, and the shaft member includes a threaded portion provided at each end thereof in an axial direction, the bent portion opening in the axial direction of the shaft member includes lengthwise-direction-end portions, and the threaded portions of the shaft member face the lengthwise-direction-end portions of the bent portion.

According to another aspect of this disclosure, a seat apparatus for a vehicle including a seat slide apparatus for a vehicle including an upper rail configured to support a seat at an upper portion of the upper rail, a lower rail supporting the upper rail in a manner that the upper rail and the lower rail are movable relative to each other, and a shaft member extended in a lengthwise direction of the upper rail, wherein the upper rail includes a pair of vertical wall portions extended in an upper/lower direction, the upper rail includes a bent portion connecting the vertical wall portions to each other at upper portions of the vertical wall portions and the shaft member is provided at an inner side of the bent portion, the shaft member includes a threaded portion provided at each end thereof in an axial direction, the bent portion opening in the axial direction of the shaft member includes lengthwise-direction-end portions, and the threaded portions of the shaft member face the lengthwise-direction-end portions of the bent portion, the seat, a support member provided at the upper portion of the upper rail and supporting the seat, and a connection member threadedly attached to each of the threaded portions, and connecting the support member, the upper rail, and the shaft member to each other.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
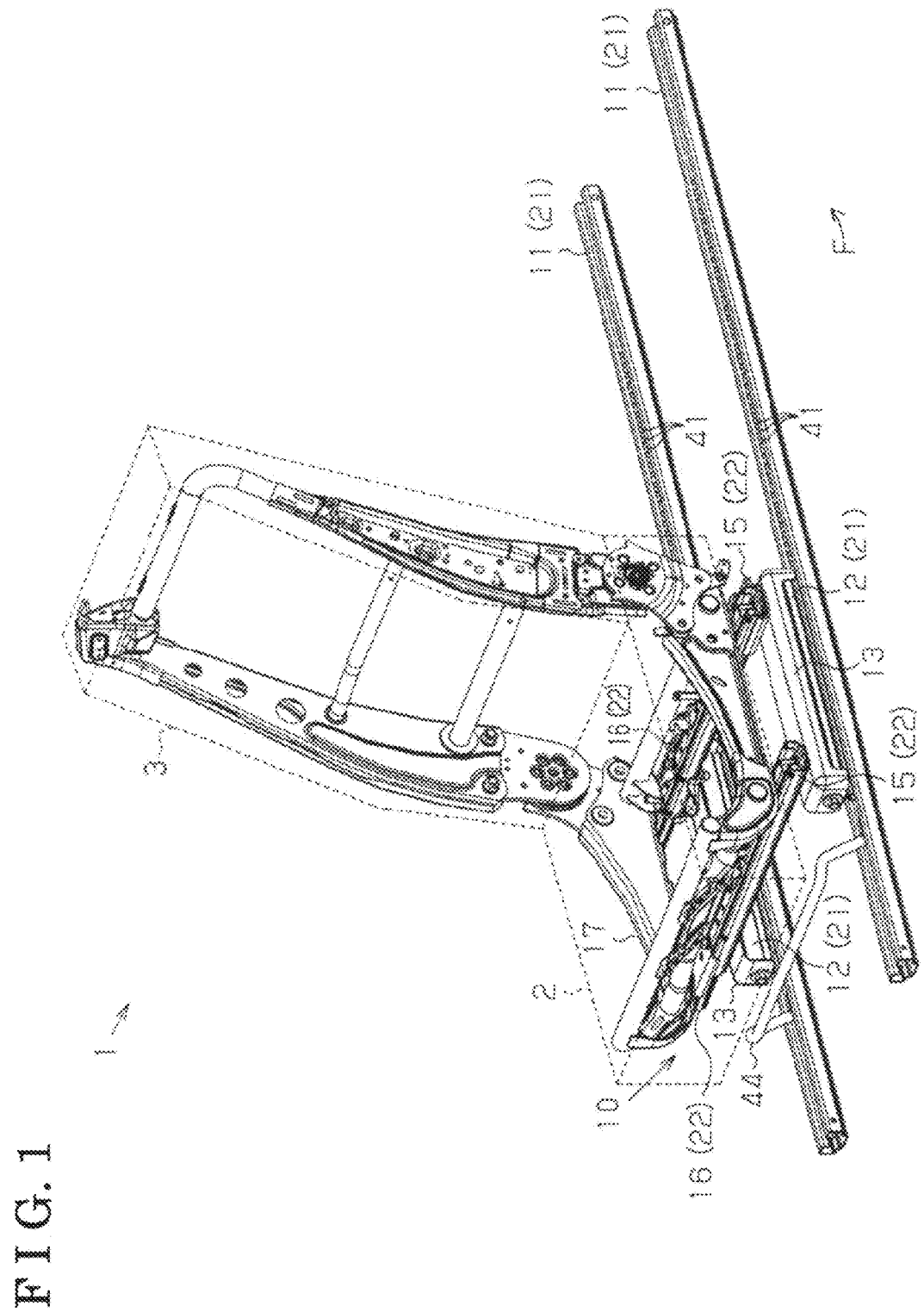
FIG. 1 is a perspective view of a seat for a vehicle, which is supported by a seat slide apparatus of an embodiment disclosed here.

An embodiment of a seat slide apparatus for a vehicle related to this disclosure will be explained with reference to the drawings. As illustrated in FIG. 1, a seat 1 for a vehicle includes a seat cushion 2 and a seat back 3 which is provided to be tiltable relative to a rear end portion of the seat cushion 2. The seat 1 is supported at a floor portion F of the vehicle via a seat slide apparatus 10.

Figure 2:
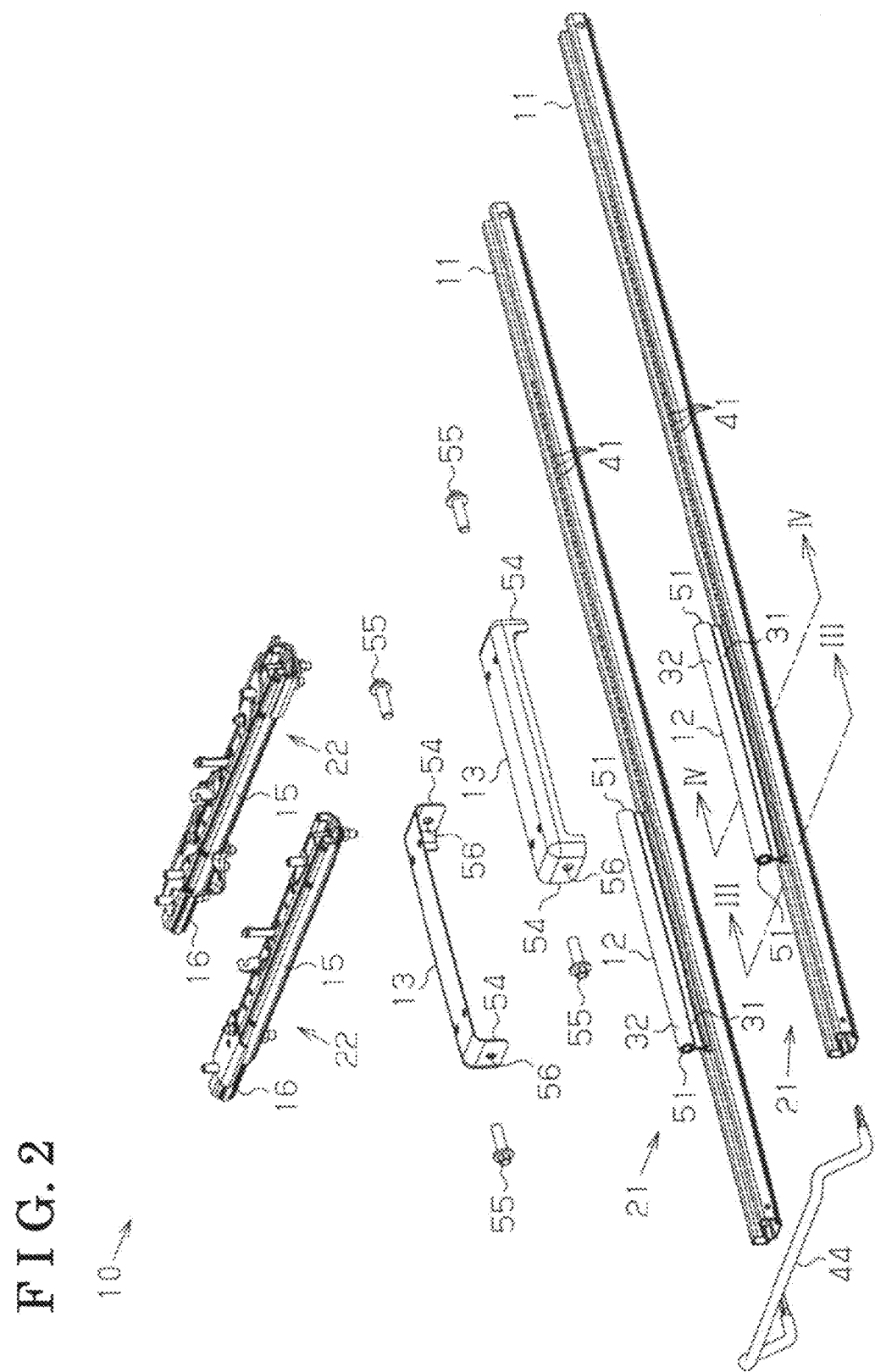
FIG. 2 is an exploded perspective view of the seat slide apparatus of the embodiment.

Specifically, as illustrated in FIGS. 1 and 2, two lower rails 11 are provided at the floor portion F of the vehicle to extend in a front/rear direction of the vehicle. The lower rails 11 are arranged to be parallel to each other. An upper rail 12 is mounted on each of the lower rails 11 to be movable thereon. A bracket 13 is fastened to an upper portion of each of the upper rails 12.

A second lower rail 15 extending in a width direction of the vehicle is attached to a front end portion of each of the brackets 13 so as to span the brackets 13 across the width direction of the vehicle. Another second lower rail 15 extending in the width direction of the vehicle is attached to a rear end portion of each of the brackets 13 so as to span the brackets 13 across the width direction of the vehicle. A second upper rail 16 is attached to each of the second lower rails 15 to be movable on the second lower rail 15. In the present embodiment, a seat frame 17 (a side frame) is fastened to the second upper rails 16.

As described above, the seat slide apparatus 10 of the present embodiment includes first slide rails 21 and second slide rails 22 which are arranged in a shape of parallel crosses or a double-cross formation, that is, the first slide rails 21 and the second slide rails 22 are arranged to form a substantially rectangular shape. Thus, a seat position in the front/rear direction and the width direction of the vehicle is adjustable. The configurations of the first slide rails 21 are identical to each other, therefore the description will be made on one of the first slide rails 21. The configurations of the second slide rails 22 are identical to each other, therefore the description will be made on one of the second slide rails 22.

The first slide rails 21 allow a position of the seat 1 in the vehicle front/rear direction to be adjusted in a case where the upper rails 12 move on the lower rails 11. The second slide rails 22 allow a position of the seat 1 in the vehicle width direction to be adjusted in a case where the second upper rails 16 move on the second lower rails 15.

Next, configurations of the lower rails 11 and the upper rails 12 which constitute the first slide rails 21, and a configuration of a lock mechanism restricting a relative movement of the lower rails 11 and the upper rails 12 relative to each other will be described. In the present embodiment, each of the lower rails 11 and the upper rails 12, which constitute the first slide rail 21, is formed by performing a folding process on plate material.

Figure 3:
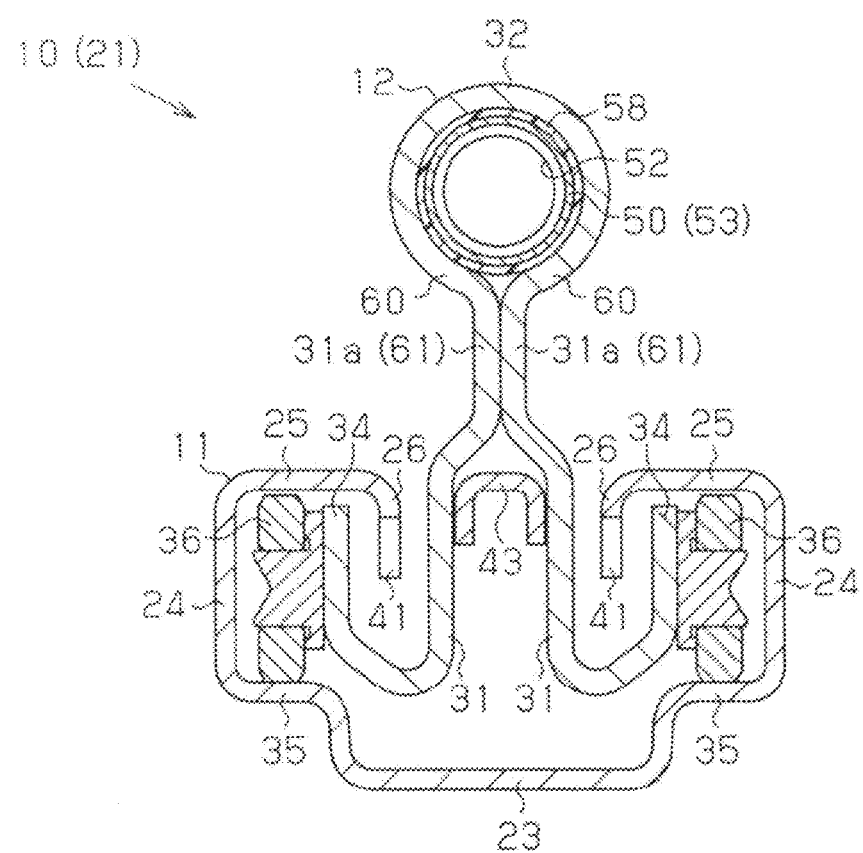
FIG. 3 is a cross-sectional view taken along line III-III in FIG. 2, which illustrates a first slide rail of the embodiment.
Figure 4:
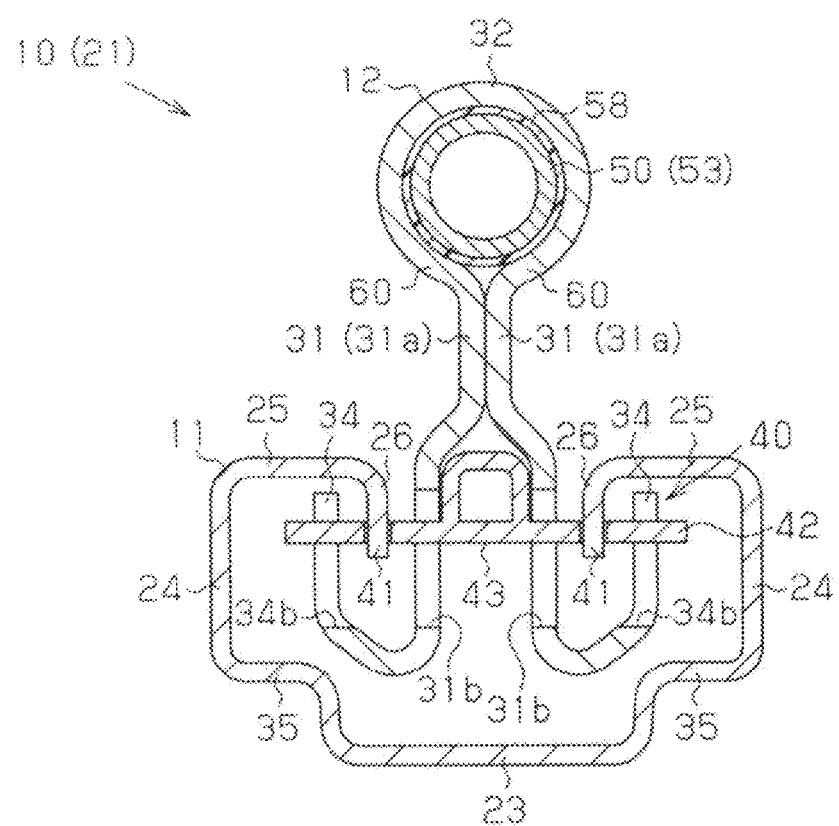
FIG. 4 is a cross-sectional view taken along line IV-IV in FIG. 2, which illustrates the first slide rail of the embodiment.
Figure 5:
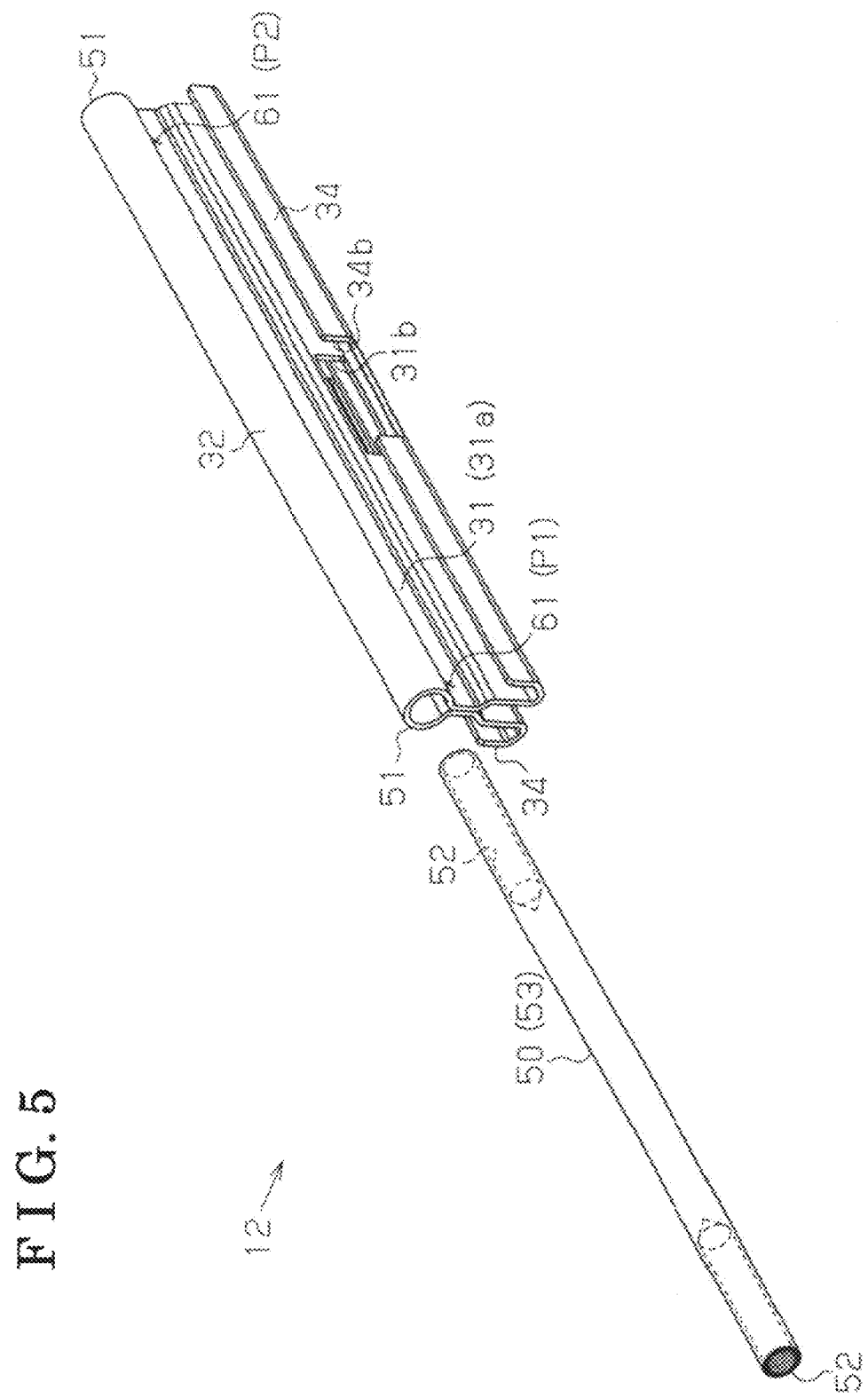
FIG. 5 is an exploded perspective view of an upper rail of the embodiment.

Specifically, as illustrated in FIGS. 3 and 4, the lower rail 11 includes a bottom wall portion 23 arranged to extend in the vehicle front/rear direction (that is, the direction perpendicular to the paper surface on which each of FIGS. 3 and 4 is drawn). An outer wall portion 24 is provided in a standing condition at each end of the bottom wall portion 23 in a width direction thereof (that is, the right and left direction in each of FIGS. 3 and 4). Further, an upper wall portion 25 is provided at an upper end of each of the outer wall portions 24. Each of the upper wall portions 25 is formed in a flange shape that is folded back inwardly in the width direction. An inner wall portion 26 is provided at an end of each of the upper wall portions 25 to be folded back downwardly. Thus, the inner wall portions 26 are arranged to face each other in the width direction with a predetermined distance provided therebetween.

On the other hand, the upper rail 12 includes a pair of vertical wall portions 31 which are arranged between the inner wall portions 26 of the lower rail 11 to extend in an upper/lower direction. The upper/lower direction corresponds to the upper/lower direction of the vehicle in a state where the seat slide apparatus 10 is mounted on the vehicle. The vertical wall portion 31 may correspond to a wall portion that is formed to be substantially vertical. The upper rail 12 includes a bent portion 32 arranged above the vertical wall portions 31 for connecting the vertical wall portions 31 to each other. In addition, the upper rail 12 includes folded-back portions 34 each of which is formed by folding a lower end of the corresponding vertical wall portion 31 upwardly. Thus, each of the folded-back portions 34 is arranged within a space portion surrounded by the corresponding outer wall portion 24, the upper wall portion 25 and the inner wall portion 26 of the lower rail 11. Plural wheels 36 are provided at each of the folded-back portions 34. The wheels 36 are in contact with track portions 35 provided at the bottom wall portion 23 of the lower rail 11 for rolling on the track portion 35. The track portion 35 is provided at each end of the bottom wall portion 23 in the width direction thereof.

That is, the upper rail 12 of the present embodiment moves on the lower rail 11 in a manner that the wheels 36 provided at the folded-back portions 34 roll, and thus the wheels 36 run on the track portions 35 with which the wheels 36 are in contact. In addition, the upper rail 12 is restricted from moving relative to the lower rail 11 in the upper direction and the width direction because the folded-back portions 34 of the upper rail 12 are surrounded by the outer wall portions 24, the upper wall portions 25 and the inner wall portions 26 of the lower rail 11. Accordingly, in the present embodiment, a positional relation of the lower rail 11 and the upper rail 12 is maintained stably.

As illustrated in FIG. 4, the seat slide apparatus 10 includes a lock mechanism 40 for restricting the relative movement of the lower rail 11 and the upper rail 12 relative to each other. Specifically, in the present embodiment, plural engagement tabs 41 are provided at each of the inner wall portions 26 of the lower rail 11 to protrude downwardly (refer to FIGS. 1 and 2). In the present embodiment, the engagement tabs 41 are arranged to be substantially equally spaced from one another to form a comb-teeth configuration. In addition, a lock member 43 including an engagement portion 42 is provided between the vertical wall portions 31 of the upper rail 12. A hole portion 31b is formed at each of the vertical wall portions 31 and the engagement portion 42 is engageable with the corresponding engagement tabs 41 of the lower rail 11 via the hole portions 31b. Further, according to the lock member 43, the engagement portion 42 moves upwardly and downwardly when an operation handle 44 provided at a front portion of the seat 1 is operated (refer to FIGS. 1 and 2). Each of the folded-back portions 34 includes a cut-out 34b which allows the engagement portion 42 to move upwardly and downwardly. Thus, the lock mechanism 40 of the present embodiment is configured to switch between a locked state where the relative movement between the lower rail 11 and the upper rail 12 is restricted and an unlocked state where the relative movement therebetween is allowed.

Specifically, according to the lock mechanism 40 of the present embodiment, when the operation handle 44 is not operated, the lock member 43 is biased by an elastic member and thus the engagement portion 42 is moved or displaced upwardly. Accordingly, the engagement portion 42 is engaged with the engagement tabs 41 of the lower rail 11, and thus the relative movement between the lower rail 11 and the upper rail 12 is restricted.

In addition, according to the lock mechanism 40 of the present embodiment, when the operation handle 44 is lifted upwardly, the lock member 43 moves downwardly. Accordingly, the engagement between the engagement portion 42 of the lock mechanism 40 and the engagement tabs 41 of the lower rail 11 is released, and thus the lower rail 11 and the upper rail 12 are allowed to move relative to each other.

Next, a support rigidity-enhancing structure of the upper rail 12 according to the present embodiment will be described.

As illustrated in FIGS. 3 to 6, in the present embodiment, each of the vertical wall portions 31 constituting the upper rail 12 includes an upper end portion 31a. The upper end portions 31a are connected to each other. In the present embodiment, by welding end portions of the upper end portions 31a in a lengthwise direction thereof (the right and left direction in FIG. 6, that is, a lengthwise direction of the upper rail 12), the upper end portions 31a are connected or joined to each other (welded points P1 and P2). The bent portion 32, which connects the vertical wall portions 31, is formed in a bag-shaped configuration including a substantially annular cross-sectional shape (a substantially annular shape of an end surface).

In the present embodiment, a shaft member 50 formed to extend in the lengthwise direction of the upper rail 12 is provided at an inner side of the bent portion 32. A threaded portion 52 is provided at each of axial ends of the shaft member 50. The threaded portions 52 face lengthwise-direction-end portions 51 of the bent portion 32 opening in the axial direction of the shaft member 50. As described above, the bracket 13, which supports the seat 1 (and the second slide rails 22) above the upper rail 12, is configured to be fastened to the upper rail 12 with the threaded portions 52.

Figure 6:
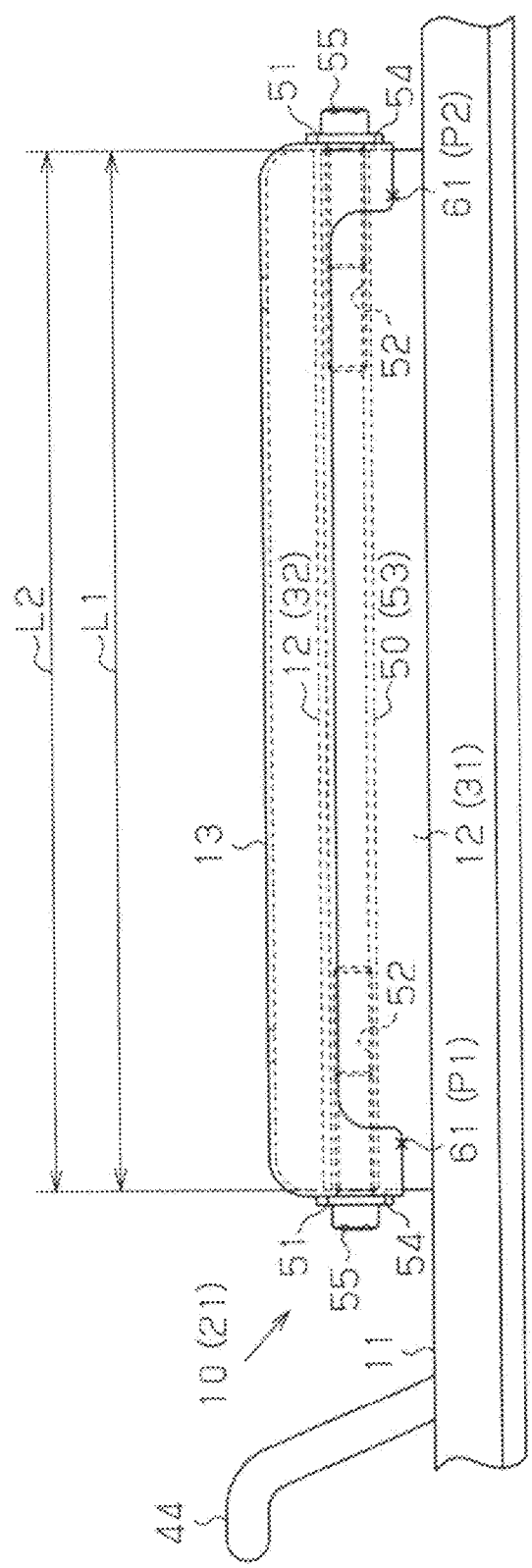
FIG. 6 is a side view of the first slide rail and a bracket fastened to the first slide rail according to the embodiment.

Specifically, in the present embodiment, a pipe 53, which corresponds to a hollow pipe, is used for the shaft member 50 as illustrated in FIGS. 4 and 6. Each of the threaded portions 52 is formed by threading an internal thread at an inner periphery of the pipe 53.

Figure 7:
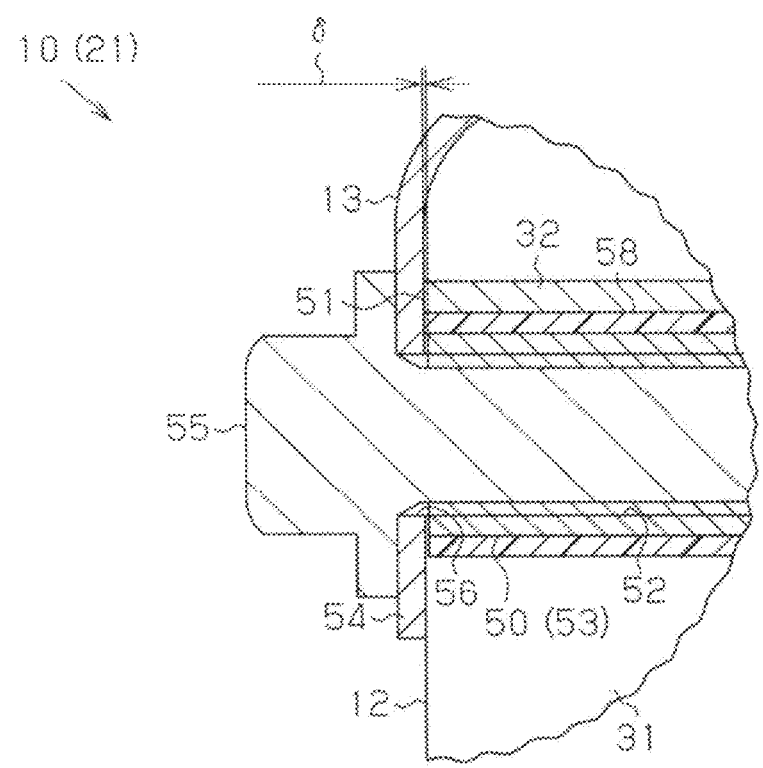
FIG. 7 is an enlarged cross-sectional view of a vicinity of a threaded portion provided at an end portion, in an axial direction, of a shaft member of the embodiment.

As illustrated in FIGS. 2, 6 and 7, a flange portion 54 is provided at each lengthwise-direction-end portion of the bracket 13 to face the corresponding lengthwise-direction-end portion 51 of the bent portion 32 in the lengthwise direction of the upper rail 12. Further, an insertion hole 56, into which a bolt 55 serving as a fastening member or a connection member is inserted, is provided at each of the flange portions 54. Thus, the bracket 13 is fastened to the upper portion of the upper rail 12 with a fastening force of the bolts 55 that are threadedly attached to the threaded portions 52 of the shaft member 50 via the insertion holes 56.

More specifically, in the present embodiment, as illustrated in FIGS. 3 and 4, lower portions of the bent portion 32, which are curved around a lower portion of the shaft member 50, serve as receiving portions 60 that support the lower portion of the shaft member 50. A buffer material 58 which is made of, for example, rubber or soft resin, is interposed between the bent portion 32 and the shaft member 50. As illustrated in FIG. 6, the welded points P1 and P2, at which the upper end portions 31a of the vertical wall portions 31 are connected to each other as described above, are set at positions corresponding to the threaded portions 52. In the present embodiment, each of the welded points P1 and P2 serves as a tightened portion 61 which reduces a diameter of the annular shape of the bent portion 32. Thus, the shaft member 50 is attached to (fitted to) the inner side of the bent portion 32 by pressure.

An axial length L1 of the shaft member 50 is slightly shorter than a length L2 of the bent portion 32 (that is, the length of the upper rail 12) (L1<L2). That is, as illustrated in FIG. 7, the shaft member 50 of the present embodiment includes an elongation allowance δ for elongation caused by the fastening which is obtained by the threaded portions 52.

Accordingly, in the present embodiment, positioning of the bracket 13 is performed easily and the bracket 13 is fastened to the upper rail 12 reliably.

Next, an operation of the seat slide apparatus including the above configuration will be described. In the present embodiment, the bracket 13 for supporting the seat 1 above the upper rail 12 is fastened to the upper portion of the upper rail 12 with use of the threaded portions 52 provided at the axial ends of the shaft member 50. That is, the upper rail 12 of the present embodiment includes the shaft member 50 arranged to extend in the lengthwise direction of the upper rail 12 and serving as a structural body, and supports a seat load. That is, the upper rail 12 includes the shaft member 50 as part of the upper rail 12. Thus, the support rigidity of the upper rail 12 is enhanced in the present embodiment.

According to the present embodiment, following effects are obtained.

(1) The upper rail 12 includes the pair of vertical wall portions 31 arranged to extend in the upper/lower direction and the bent portion 32 arranged at the upper portion of each of the vertical wall portions 31 for connecting the vertical wall portions 31 to each other. Further, the shaft member 50 formed to extend in the lengthwise direction of the upper rail 12 is provided within the bent portion 32. The threaded portion 52 is provided at each of the axial ends of the shaft member 50. The threaded portions 52, which face the lengthwise-direction-end portions 51 of the bent portion 32 opening in the axial direction of the shaft member 50, are provided at the axial ends of the shaft member 50.

According to the above-described configuration, the bolt 55 is threadedly attached to, that is, screwed in, each of the threaded portions 52 of the shaft member 50 via the lengthwise-direction-end portion 51 of the bent portion 32. Accordingly, the seat 1 (the bracket 13) is fastened to the upper portion of the upper rail 12 with the fastening force of the bolts 55. In addition, the shaft member 50 serves as the structural body, and thus the support rigidity of the upper rail 12 is enhanced along an entire length thereof. That is, because the seat load is received by the shaft member 50, deformation is not likely to occur to the vertical wall portions 31 or the bent portion 32 which are formed by the folding process. Particularly, a bending strength of the upper rail 12 in the lengthwise direction may be enhanced significantly. Thus, a smooth relative movement between the lower rail 11 and the upper rail 12, and a stable operation of the lock mechanism are assured, thereby ensuring a high reliability. In addition, at the shaft member 50, a tensile force which elongates or pulls out the shaft member 50 is generated by the fastening which is obtained by the threaded portion 52 provided at each of the axial ends of the shaft member 50. Thus, the fastened condition is maintained stably.

(2) The bent portion 32 of the upper rail 12 includes the annular shape and the shaft member 50 is fitted in the inner side of the annular shape. With such a configuration, the shaft member 50 is maintained at the inner side of the bent portion 32 easily and reliably with the simple configuration. Thus, the high support rigidity of the upper rail is assured.

(3) The lower portions of the bent portion 32, which are curved around the lower portion of the shaft member 50 so as to surround the lower portion of the shaft member 50, form the receiving portions 60 supporting the lower portion of the shaft member 50. With such a configuration, the shaft member 50 is held at the inner side of the bent portion 32 against the seat load in a direction in which the shaft member 50 is pushed downwardly. Thus, the high support rigidity is assured.

(4) The upper rail 12 includes the tightened portions 61 (the welded points P1 and P2) which connect the upper end portions 31a of the vertical wall portions 31 to each other and thus reduce the diameter of the annular shape of the bent portion 32. According to the above-described configuration, after the shaft member 50 is arranged at the inner side of the bent portion 32, the diameter of the annular shape of the bent portion 32 is reduced so that the shaft member 50 is attached to the inner side of the bent portion 32 by pressure (that is, the shaft member 50 is fitted to the inner side of the bent portion 32). Thus, the shaft member 50 is held at the inside of the bent portion 32 easily and reliably.

(5) The axial length L1 of the shaft member 50 is slightly shorter than the length L2 of the bent portion 32 (L1<L2). That is, the elongation allowance δ for the elongation of the shaft member 50 which is caused by the fastening thereof is provided at the shaft member 50 in advance, and thus the positioning of the upper rail 12 and the member fastened to the upper rail 12 is performed easily. Thus, the fastening which uses the threaded portion 52 is reliably ensured.

(6) The buffer material 58 is arranged between the bent portion 32 of the upper rail 12 and the shaft member 50. Thus, a resonance frequency of the seat 1 is lowered, or resonance amplitude of the seat 1 is reduced. As a result, a damping effect of the resonance is enhanced. Because the shaft member 50 that is pre-coated with the buffer material 58 is used, that is, the shaft member 50 is coated with the buffer material 58 in advance, the vibration-proof effects and the sound-proof effects are obtained easily at low costs.

(7) The pipe 53, which is hollow, is used as the shaft member 50. As a result, weight of the shaft member 50 is reduced while a high strength is maintained. In addition, because the internal threads are formed at the inner periphery of the axial end portions of the pipe 53 (the shaft member 50), the threaded portions 52 are provided easily.

The aforementioned embodiment may be modified as follows. In the aforementioned embodiment, the seat 1 includes the first slide rails 21 and the second slide rails 22 which are arranged in the shape of the parallel crosses. The rigidity-enhancing structure of the upper rails 12, which is achieved by the shaft member 50 including the threaded portions 52 provided at the end portions of the shaft member 50, is applied to the first slide rails 21. However, the application of the rigidity-enhancing structure is not limited thereto. The similar rigidity-enhancing structure may be applied to the second slide rails 22 that are provided above the first slide rails 21 via the brackets 13. Alternatively, the similar rigidity-enhancing structure may be applied to the first slide rails 21 and the second slide rails 22.

The second slide rails 22 may be omitted from the configuration of the present embodiment. That is, the seat frame 17 (for example, a side frame) may be fastened directly to the shaft member 50 without interposing a supporting member including, for example, the bracket 13.

In the aforementioned embodiment, the bent portion 32 of the upper rail 12 includes the bag-shaped configuration of which the cross-sectional shape (the shape of the end surface) is substantially annular. However, the cross-sectional shape of the bent portion 32 is not limited to the substantially annular. For example, in a case where the shaft member 50 is formed in a polygon shape, the bent portion 32 may include such a cross-sectional shape that allows the shaft member 50 to be fitted into the inner periphery of the bent portion 32. In addition, a shape of the opening portion at the lengthwise-direction-end portion 51 of the bent portion 32 may be modified arbitrarily.

Figure 8:
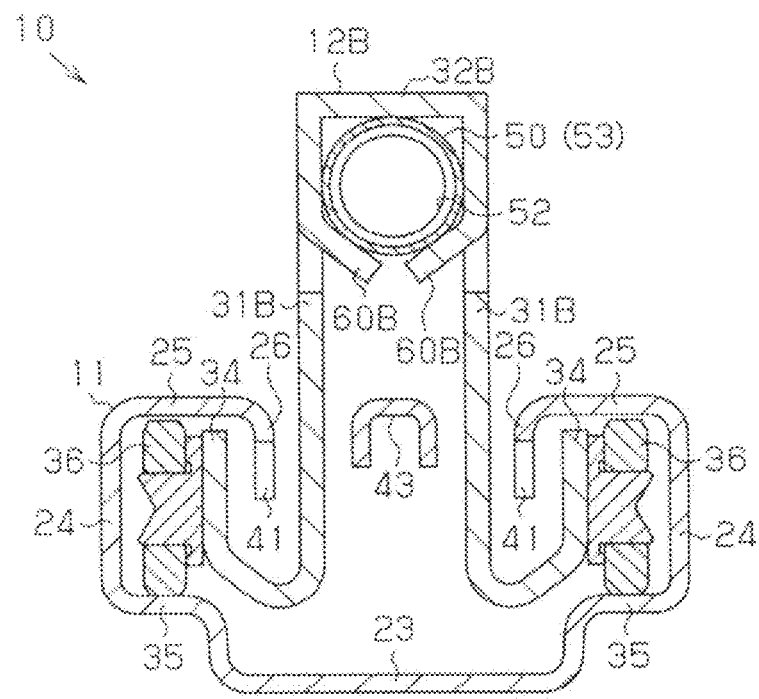
FIG. 8 is a cross-sectional view illustrating another example of the seat slide apparatus of the embodiment.

The bent portion 32 may include a configuration other than the bag-shaped configuration and may open downwardly. In that case, as illustrated in FIG. 8, an upper rail 12B may include vertical wall portions 31B. For example, a portion of each of the vertical wall portions 31B is cut out and the cut-out portion is bent and raised to form a receiving portion 60B which supports the lower portion of the shaft member 50 arranged at an inner side of a bent portion 32B of the upper rail 12B. A method of forming the receiving portion 60B may be arbitrarily modified. For example, a separate member may be fixedly attached to the vertical wall portions.

In the aforementioned embodiment, the upper rail 12 is provided with the tightened portions 61 (the welded portions P1 and P2) which connect or join the upper end portions 31a of the vertical wall portions 31 to each other at the end portions of the upper rail 12 in the lengthwise direction thereof, and thus reduce the diameter of the annular shape of the bent portion 32. However, the tightened portion 61 may be provided at the upper rail 12 continuously over an entire range in the lengthwise direction of the upper rail 12, or at plural positions over the entire range in the lengthwise direction of the upper rail 12.

Figure 9:
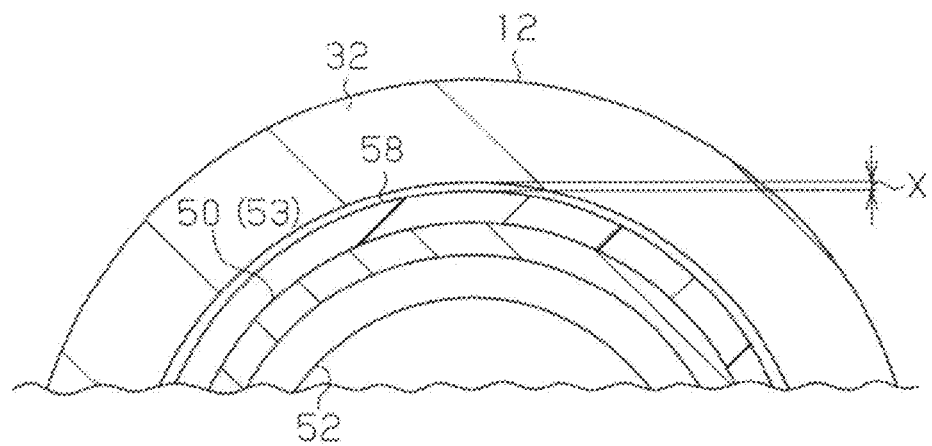
FIG. 9 is an enlarged cross-sectional view taken along line IV-IV of FIG. 2, which illustrates the seat slide apparatus of the embodiment.

That is, in a case where the tightened portions 61 are provided at the end portions of the upper rail 12 in the lengthwise direction thereof, a clearance X is generated between the bent portion 32 and the shaft member 50 (and the buffer material 58) as illustrated in FIG. 9 at an intermediate portion of the upper rail 12 in the lengthwise direction. However, with the above-described configuration, the clearance X is reduced. As a result, the shaft member 50 arranged at the inner side of the bent portion 32 is supported more reliably.

In the aforementioned embodiment, the tightened portion 61 is formed by connecting the upper end portions 31a of the vertical wall portions 31 to each other by means of welding. However, a method of connecting the upper end portions 31a of the vertical wall portions 31 is not limited to the welding. The upper end portions 31a of the vertical wall portions 31 may be connected to each other by crimping or staking, or by fastening. Alternatively, the upper end portions 31a may be connected to each other by adhesion or bonding. A structure of securing the shaft member 50 at the inner side of the bent portion 32B may be arbitrarily modified. For example, the shaft member 50 may be fixed at the inner side of the bent portion 32B by fastening or welding. Alternatively, the shaft member 50 may be fixed at the inner side of the bent portion 32B by adhesion or bonding.

In the aforementioned embodiment, the pipe 53, which corresponds to the hollow pipe, is used for the shaft member 50. However, the shaft member 50 is not limited to the hollow pipe but may be a shaft which does not include a hollow portion (that is, the shaft member 50 may be a so-called solid shaft member). In addition, the apparatus may include a configuration where the buffer material 58 is not interposed between the bent portion 32 and the shaft member 50.

Further, the threaded portions 52 provided at the shaft member 50 in the axial direction thereof are not limited to the internal threads formed at the inner periphery (that is, a nut configuration). The threaded portions 52 may be formed by external threads provided at an outer periphery of the shaft member 50 (that is, a bolt configuration). In that case, a length of a portion of the shaft member 50 at which the external threads are not provided may be defined as "the axial length L1 of the shaft member 50" and the axial length L1 may be set at a smaller value than the length L2 of the bent portion 32.

Figure 10:
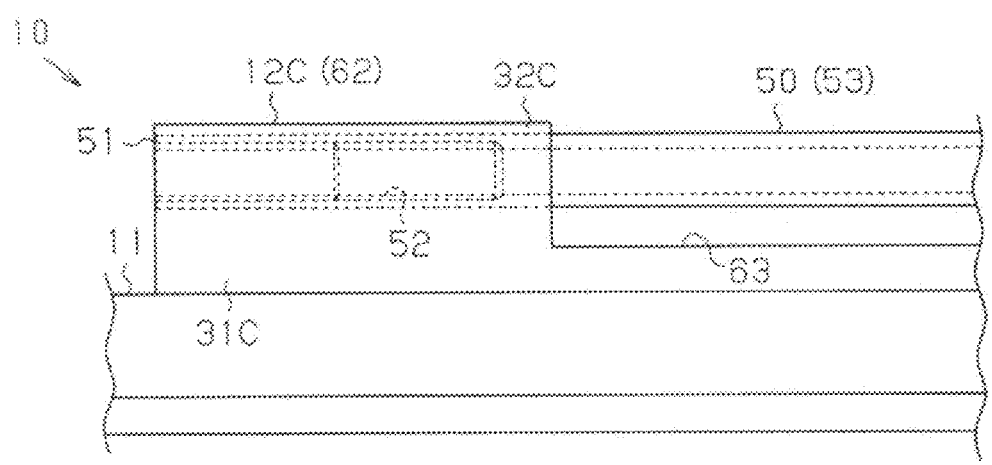
FIG. 10 is a side view illustrating another example of the seat slide apparatus of the embodiment.

As illustrated in FIG. 10, the upper rail 12C includes a main portion 62. The main portion 62 includes vertical wall portions 31C and a bent portion 32C. A lightening portion 63 (an opening portion) may be provided at the main portion 62. That is, because the seat load is received by the shaft member 50, the main portion 62 is not required to include the high strength. As a result, the weight of the upper rail 12C is reduced while the high support rigidity of the upper rail 12C is maintained.

Next, technical ideas and effects thereof, which may be grasped from the aforementioned embodiment will be described. (A) According to the seat slide apparatus for the vehicle, the threaded portion 52 is used for fastening the bracket 13 (i.e., the support member) which is provided at the upper portion of the upper rail 12, 12B, 12C for supporting the seat 1. As a result, the seat 1 is supported reliably.

(B) According to the seat slide apparatus for the vehicle, the upper rail 12C includes the main portion 62 which includes the vertical wall portions 31C and the bent portion 32C, and the lightening portion 63 is provided at the main portion 62. As a result, the weight of the upper rail 12C is reduced.

According to the aforementioned embodiment, the seat slide apparatus for the vehicle includes the upper rail 12, 12B, 12C configured to support the seat 1 at the upper portion of the upper rail 12, 12B, 12C, the lower rail 11 supporting the upper rail 12, 12B, 12C in a manner that the upper rail 12, 12B, 12C and the lower rail 11 are movable relative to each other, and the shaft member 50 extended in the lengthwise direction of the upper rail 12, 12B, 12C, wherein the upper rail 12, 12B, 12C includes the pair of vertical wall portions 31, 31B, 31C extended in the upper/lower direction, the upper rail 12, 12B, 12C includes the bent portion 32, 32B, 32C connecting the vertical wall portions 31, 31B, 31C to each other at the upper portions of the vertical wall portions 31, 31B, 31C and the shaft member 50 is provided at the inner side of the bent portion 32, 32B, 32C, and the shaft member 50 includes the threaded portion 52 provided at each end thereof in the axial direction, the bent portion 32, 32B, 32C opening in the axial direction of the shaft member 50 includes the lengthwise-direction-end portions 51, and the threaded portions 52 of the shaft member 50 face the lengthwise-direction-end portions 51 of the bent portion 32, 32B, 32C.

According to the above-described configuration, the bolt 55 is threadedly attached to each of the threaded portions 52 of the shaft member 50 via the lengthwise-direction-end portion 51 of the bent portion 32, 32B, 32C. Thus, the seat 1 (or the bracket 13 for supporting the seat 1) is fastened to the upper portion of the upper rail 12, 12B, 12C with the fastening force of the bolts 55. In addition, the shaft member 50 serves as the structural body, and thus the support rigidity of the upper rail 12, 12B, 12C is enhanced along the entire length thereof. That is, because the seat load is received by the shaft member 50, the deformation is not likely to occur to the vertical wall portions 31, 31B, 31C and the bent portion 32, 32B, 32C which constitute an outer shell (that is, the main portion 62) of the upper rail. Particularly, the bending strength of the upper rail 12, 12B, 12C in the lengthwise direction thereof may be enhanced significantly, thereby ensuring the high reliability. In addition, at the shaft member 50, the tensile force which elongates or pulls out the shaft member 50 is caused by the fastening which is achieved by threaded portion 52 provided at each of the axial ends of the shaft member 50. Thus, the fastened state is maintained stably.

Consequently, with the simple configuration, a higher support rigidity of the upper rail 12, 12B, 12C is ensured.

According to the aforementioned embodiment, the upper rail 12, 12B, 12C includes the receiving portion 60, 60B supporting the lower portion of the shaft member 50.

According to the above-described configuration, the shaft member 50 is held at the inner side of the bent portion 32, 32B, 32C against the seat load in the direction in which the shaft member 50 is pushed downwardly. Consequently, the high support rigidity is ensured.

According to the aforementioned embodiment, the bent portion 32, 32C includes the annular shape to which the shaft member 50 is fitted.

According to the above-described configuration, the shaft member 50 is maintained at the inner side of the bent portion 32, 32C easily and reliably with the simple configuration. Thus, the high support rigidity is assured.

According to the aforementioned embodiment, the shaft member 50 is held at the inner side of the bent portion 32, 32B, 32C against the seat load in the direction in which the shaft member 50 is pushed downwardly. Consequently, the high support rigidity is ensured.

According to the above-described configuration, the shaft member 50 is maintained at the inner side of the bent portion 32, 32C easily and reliably with the simple configuration. Thus, the high support rigidity is assured.

According to the aforementioned embodiment, the upper rail 12 includes the tightened portion 61 which connects the vertical wall portions 31 to each other and reduces the diameter of the annular shape of the bent portion 32.

According to the above-described configuration, after the shaft member 50 is arranged at the inner side of the bent portion 32, the diameter of the annular shape of the bent portion 32 is reduced and the shaft member 50 is attached to the inner side of the bent portion 32 by pressure (that is, the shaft member 50 is fitted to the inner side of the bent portion 32). Consequently, the shaft member 50 is held at the inside of the bent portion 32 easily and reliably.

According to the aforementioned embodiment, the shaft member 50 includes the axial length L1 that is set to be shorter than the length L2 of the bent portion 32.

According to the above-described configuration, the "elongation allowance δ" for elongation caused by the fastening is provided at the shaft member 50 in advance, and thus the positioning of the upper rail 12 and the member fastened to the upper rail 12 is performed easily. Consequently, the fastening which is achieved by the threaded portions 52 is reliably ensured.

According to the aforementioned embodiment, the seat slide apparatus includes the buffer material 58 interposed between the bent portion 32 and the shaft member 50.

According to the above-described configuration, the buffer material 58 is interposed between the bent portion 32 and the shaft member 50, and thus the resonance frequency is lowered, or the resonance amplitude is reduced. As a result, the damping effect of the resonance is enhanced.

According to the aforementioned embodiment, the shaft member 50 is pre-coated with the buffer material 58.

According to the above-described configuration, the vibration-proof effects and the sound-proof effects are obtained easily at low costs.

According to the aforementioned embodiment, the shaft member 50 corresponds to the pipe 53 which is hollow.

According to the above-described configuration, the weight of the shaft member 50 is reduced while the high strength is maintained. In addition, because the internal thread is formed at the inner periphery of the axial end portions of the pipe 53, the threaded portions 52 are provided easily.

According to the aforementioned embodiment, the pipe 53 includes the threaded portion 52 provided at the inner periphery of each end of the pipe 53 in the axial direction thereof.

According to the aforementioned embodiment, the threaded portion 52 is configured to fasten the bracket 13 (i.e., the support member) provided at the upper portion of the upper rail 12, 12B, 12C and supporting the seat 1.

According to the above-described configuration, the seat 1 is supported reliably.

According to the aforementioned embodiment, the upper rail 12C includes the main portion 62 which includes the vertical wall portions 31C and the bent portion 32C, and the lightening portion 63 is provided at the main portion 62.

According to the above-described configuration, the weight of the upper rail 12C is reduced.

According to the aforementioned embodiment, a seat apparatus for a vehicle includes the seat slide apparatus for the vehicle including the upper rail 12, 12B, 12C configured to support the seat 1 at the upper portion of the upper rail 12, 12B, 12C, the lower rail 11 supporting the upper rail 12, 12B, 12C in a manner that the upper rail 12, 12B, 12C and the lower rail 11 are movable relative to each other, and the shaft member 50 extended in the lengthwise direction of the upper rail 12, 12B, 12C, wherein the upper rail 12, 12B, 12C includes the pair of vertical wall portions 31, 31B, 31C extended in the upper/lower direction, the upper rail 12, 12B, 12C includes the bent portion 32, 32B, 32C connecting the vertical wall portions 31, 31B, 31C to each other at the upper portions of the vertical wall portions 31, 31B, 31C and the shaft member 50 is provided at the inner side of the bent portion 32, 32B, 32C, the shaft member 50 includes the threaded portion 52 provided at each end thereof in the axial direction, the bent portion 32, 32B, 32C opening in the axial direction of the shaft member 50 includes the lengthwise-direction-end portions 51, and the threaded portions 52 of the shaft member 50 face the lengthwise-direction-end portions 51 of the bent portion 32, 32B, 32C, the seat 1, the bracket 13 provided at the upper portion of the upper rail 12, 12B, 12C and supporting the seat 1, and the bolt 55 threadedly attached to each of the threaded portions 52, and connecting the bracket 13, the upper rail 12, 12B, 12C and the shaft member 50 to each other.

According to the aforementioned embodiment, the bracket 13 includes the flange portion 54 facing the lengthwise-direction-end portion 51 of the bent portion 32, 32B, 32C, and the insertion hole 56 into which the bolt 55 is inserted is provided at the flange portion 54.

According to the aforementioned embodiment, the shaft member 50 includes the elongation allowance δ for the elongation caused by the fastening which is obtained by the bolt 55.

According to the above-described configuration, the positioning of the bracket 13 is performed easily and the bracket 13 is fixed at the upper rail 12, 12B, 12C reliably.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat slide apparatus for a vehicle, comprising:
an upper rail configured to support a seat at an upper portion of the upper rail;
a lower rail supporting the upper rail in a manner that the upper rail and the lower rail are movable relative to each other; and
a shaft member extended in a lengthwise direction of the upper rail, wherein
the upper rail includes a pair of vertical wall portions extended in an upper/lower direction,
the upper rail includes a bent portion connecting the vertical wall portions to each other at upper portions of the vertical wall portions and the shaft member is provided at an inner side of the bent portion,
the shaft member includes a threaded portion provided at each end thereof in an axial direction, the bent portion includes lengthwise-direction-end portions that open in the axial direction of the shaft member, and the threaded portions of the shaft member face the lengthwise-direction-end portions of the bent portion, and
the bent portion includes an annular shape to which the shaft member is fitted.

2. The seat slide apparatus according to claim 1, wherein the upper rail includes a receiving portion supporting a lower portion of the shaft member.

3. The seat slide apparatus according to claim 1, wherein the upper rail includes a main portion which includes the vertical wall portions and the bent portion, and a lightening portion is provided at the main portion.

4. The seat slide apparatus according to claim 1, wherein the bent portion is configured to support a lower portion of the shaft member.

5. The seat slide apparatus according to claim 1, wherein the upper rail includes a tightened portion which connects the vertical wall portions to each other and reduces a diameter of the annular shape of the bent portion.

6. The seat slide apparatus according to claim 1, wherein the shaft member includes an axial length that is set to be shorter than a length of the bent portion.

7. The seat slide apparatus according to claim 1, wherein the threaded portion is configured to fasten a support member provided at the upper portion of the upper rail and supporting the seat.

8. The seat slide apparatus according to claim 1, further comprising:
a buffer material interposed between the bent portion and the shaft member.

9. The seat slide apparatus according to claim 8, wherein the shaft member is pre-coated with the buffer material.

10. The seat slide apparatus according to claim 1, wherein the shaft member includes a pipe which is hollow.

11. The seat slide apparatus according to claim 10, wherein the pipe includes the threaded portion provided at an inner periphery of each end of the pipe in an axial direction thereof.

* * * * *